(12) United States Patent
Mosher

(10) Patent No.: US 6,390,447 B1
(45) Date of Patent: May 21, 2002

(54) VALVED CONDUIT AND METHOD OF MAKING A VALVED CONDUIT

(75) Inventor: Randall Mosher, Loudonville, OH (US)

(73) Assignee: Rain Drop Products, LLC, Ashland, OH (US)

(*) Notice: Subject to any disclaimer, the term of this patent is extended or adjusted under 35 U.S.C. 154(b) by 0 days.

(21) Appl. No.: 09/684,338

(22) Filed: Oct. 10, 2000

(51) Int. Cl.[7] ................................. F16K 1/22
(52) U.S. Cl. ....................... 251/151; 251/305
(58) Field of Search ................. 251/305, 306, 251/307, 308, 149.2, 151

(56) References Cited

U.S. PATENT DOCUMENTS

| | | | |
|---|---|---|---|
| 684,270 A | * 10/1901 | Kornreich | 251/306 X |
| 3,295,821 A | * 1/1967 | McQuown | 251/305 |
| 3,990,675 A | * 11/1976 | Bonafous | 251/306 X |
| 4,213,595 A | * 7/1980 | Sheppard | 251/308 |
| 4,944,325 A | * 7/1990 | Baldwin et al. | 251/308 X |
| 5,029,811 A | * 7/1991 | Yamamoto et al. | 251/306 |
| 5,033,510 A | * 7/1991 | Huber | 251/294 X |
| 5,531,205 A | * 7/1996 | Cook et al. | 251/306 X |
| 5,681,025 A | * 10/1997 | Kuhn et al. | 251/306 X |
| 5,979,871 A | * 11/1999 | Forbes et al. | 251/305 |
| 6,193,214 B1 | * 2/2001 | Schatz | 251/305 |

* cited by examiner

Primary Examiner—Henry C. Yuen
Assistant Examiner—John Bastianelli
(74) Attorney, Agent, or Firm—Leydig, Voit, & Mayer, Ltd.

(57) ABSTRACT

A valved conduit includes two substantially flangeless pipes adhesively bonded end-to-end at respective end walls of the two pipes at a joint; a butterfly valve including a protruding stem and a protruding anti-rotation tab, the butterfly valve being disposed inside the two pipes at the joint with the stem and the anti-rotation tab being engaged by end walls of the two pipes at the joint, the stem extending through the joint and beyond the pipes. A method of making a valved conduit includes shaping end walls of two substantially flangeless pipes to form substantially planar end wall surfaces, each end wall also including surfaces defining an opening for receiving a valve stem and a slot for receiving a valve anti-rotation tab; applying an adhesive to the end wall surfaces; positioning a butterfly valve including a stem and an anti-rotation tab within the two pipes with the stem and the anti-rotation tab between the end walls of the two pipes and the stem and the anti-rotation tab in contact with the opening and the slot, respectively, the stem extending through the opening beyond the pipes; and bringing the substantially planar end wall surfaces into contact and adhesively bonding the substantially planar end wall surfaces of the two pipes together at a joint.

14 Claims, 2 Drawing Sheets

VALVED CONDUIT AND METHOD OF MAKING A VALVED CONDUIT

FIELD OF THE INVENTION

The invention relates to valved conduits, i.e., pipes including a valve, for regulating and substantially stopping the flow of a fluid through the conduit, and a method of fabricating the valved conduit.

BACKGROUND

Typical piping systems employ pipes that are joined together at flanges at or near the ends of respective pipe sections. Adjacent pipes are joined together by fastening the flanges, for example, using bolts extending through cooperating bores in the flanges. Valves installed in these piping systems using flanged pipes also typically include flanges or other protrusions that are secured between and to flanges of adjoining pipes to fabricate a valved conduit. Gaskets are frequently employed between the valves and pipes to form seals and prevent leakage of liquids between the flanged pipes and the valve.

Flanged pipes have a variety of drawbacks. For example, since multiple elements must be aligned, i.e., flanges of the pipes flanges of a valve, and gaskets, assembly is complicated. In addition, flange bolts employed to join pipe sections with or without an intervening valve may have sharp edges that can be produced during assembly. These sharp edges and other protrusions are undesirable in many applications, for example, where the joint is exposed and accessible by the public. Furthermore, flange joints are bulky and detract from the overall appearance of a piping system. Flanged joints have an industrial appearance that may be inappropriate in various consumer oriented environments where the joints are exposed.

Accordingly, there is a need for a simple valved conduit that does not require the use of flanged pipes or the alignment of multiple elements in fabrication and that has a pleasing appearance. Likewise, there is a need for a valved conduit that is free of sharp edges or protrusions that might be dangerous to persons who have access to the joints.

SUMMARY OF THE INVENTION

The present invention provides a valved conduit and a method of making a valved conduit that is simply fabricated, that has a pleasing appearance to the public, and that is free of sharp edges that might cause injuries.

According to one aspect of the invention, a valved conduit comprises two substantially flangeless pipes that are adhesively bonded end-to-end at respective end walls of the pipe at a joint. A butterfly valve including a protruding stem and a protruding anti-rotation tab is disposed inside the two pipes at the joint. The anti-rotation tab and the stem are engaged by end walls of the pipes at the joint and the stem extends through the joint outside the pipes of the conduit for control of the butterfly valve.

The end walls of two substantially flangeless pipes are shaped to form substantially planar end wall surfaces, each end wall surface also including respective surfaces defining an opening for receiving a valve stem and a slot for receiving a valve anti-rotation tab. An appropriate adhesive is applied to the planar end wall surfaces and the surfaces defining opening and the slot of the two pipes. A butterfly valve including a stem and an anti-rotation tab is positioned within the openings with the stem and anti-rotation tab received within the openings and the slot, respectively, so that the planar end wall surfaces of the two pipes are in contact with each other and the surfaces of the opening and slot are in contact with the valve stem and the anti-rotation tab. Thereafter, the end wall surfaces of the two pipes are bonded together and to the valve stem and anti-rotation tab.

BRIEF DESCRIPTION OF DRAWING FIGURES

DETAILED DESCRIPTION

A valved conduit in accordance with the invention includes two substantially flangeless pipes adhesively bonded end-to-end at a joint, with a valve located substantially within the adhesively bonded pipes at the joint. The pipes may comprise any material suitable for adhesive bonding such as fiberglass, plastic, or resins. The pipes may be bonded using any adhesive that is compatible with the pipe material and provides a sufficiently strong bond to withstand the pressures of a fluid in the conduit. For example, a high strength epoxy glue may preferably be used for bonding two fiberglass pipes together at end wall surfaces of the pipes.

Although the invention may be applied to a wide variety of known valve types, a preferred valve according to the invention is a butterfly valve. Butterfly valves are well known and commercially available. Usually, a butterfly includes an anti-rotation tab for preventing rotation of the valve within a pipe because butterfly valves, unlike some other valve types, experience torsional forces when the valve is partially opened. Butterfly valves, like other valves, also include a valve stem that houses a rod that is connected to the vane that characterizes a butterfly valve. Turning the rod changes the orientation of the vane and regulates fluid flow through the valve.

Valved conduits according to the invention and including a butterfly valve preferably employ a butterfly valve having an outside diameter smaller than the inside diameter of the pipes forming the conduit and in which the butterfly valve is mounted. For example, a 4-inch inside diameter butterfly valve may preferably be disposed within 6-inch inside diameter pipes. The advantage of using a valve having a smaller outside diameter than the inside diameter of the pipes of the valved conduit is that total fluid flow shut-off is prevented when the valve is closed. The continuing fluid flow past the valve, i.e., between the valve and the pipe, reduces the probability of water hammer effects and damage to a pump pumping the fluid when the valve is rapidly closed. In some applications of the invention, the public is given access to the valved conduit for controlling the flow of pumped water. The space between the valve and the pipe provides a measure of safety against damage of equipment that can be particularly important in such applications. However, the invention also contemplates use of a valve that fits tightly with inside pipes of the conduit that may completely stop the flow of a fluid through the conduit.

Figure 1:
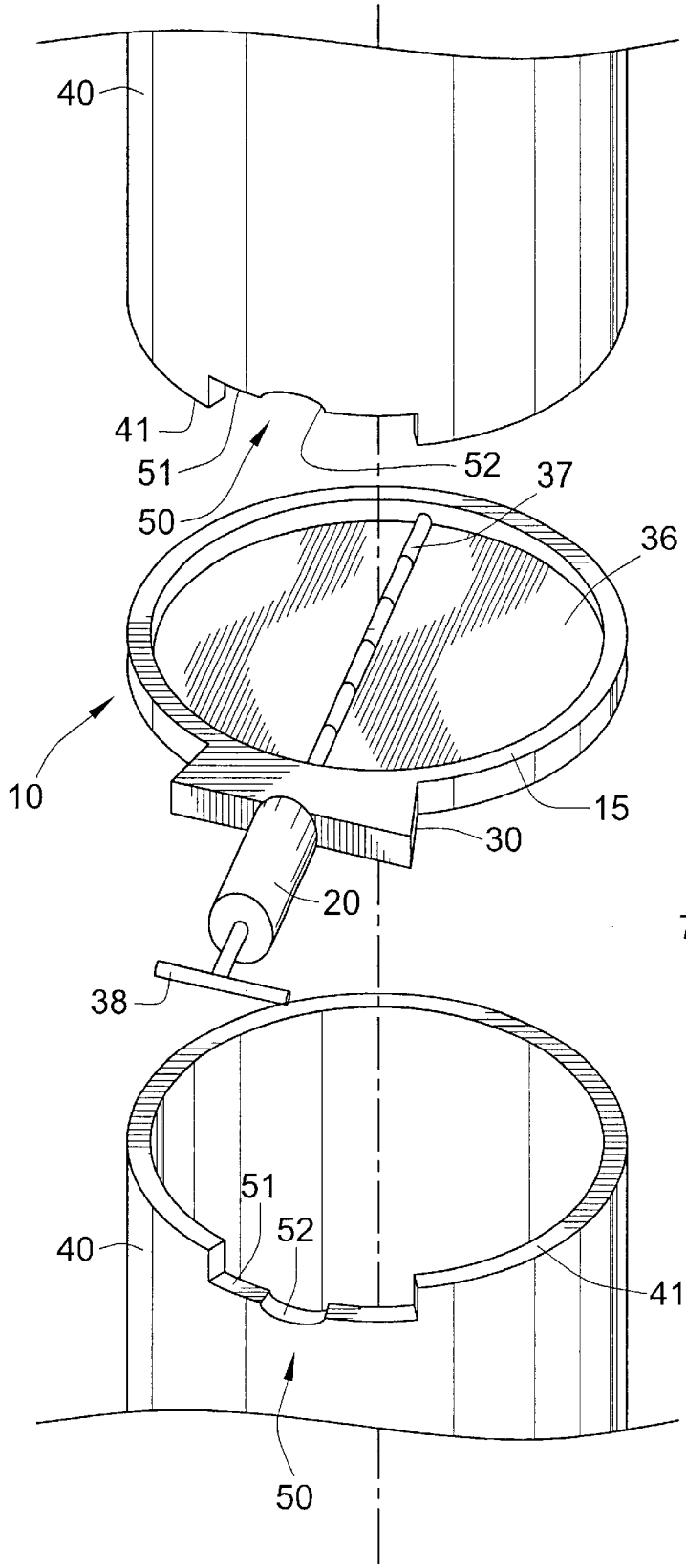
FIG. 1 is an exploded view showing the components of a valved conduit assembly according to an embodiment of the invention.

FIG. 1 is an exploded view of a valved conduit according to the invention, useful in understanding the construction and assembly of that valved conduit. This exemplary construction includes a butterfly valve 10 having a peripheral, generally annular, housing 15. A valve stem 20 and an anti-rotation tab 30 protrude from the housing 15. Within the housing 15 is a vane 36 that characterizes the butterfly valve and a rod 37, attached to the vane 36. The rod 37 extends through the stem 20 to a handle 38 for rotating the vane 36.

Two substantially flangeless pipes 40 have end walls that are shaped for being joined together and to receive parts of the butterfly valve. Where the pipes 40 are joined in contact with each other, they include substantially planar end wall surfaces 41. The planar end wall surfaces 41 do not extend entirely around the circumferences of the pipes. Each of the pipes includes a cut-out 50 having a slot 51 shaped to receive and contact the anti-rotation tab 30 of the valve and an opening 52, generally shown as part of a circular arc in the depicted embodiment, for receiving and contacting the valve stem 20 when the planar end surfaces 41 of the two pipes 40 are brought into contact with each other.

In assembling a valved conduit according to the invention, the end wall surfaces of the pipes 40, including the planar surfaces 41, the slot 51, and the opening 52, are coated with an appropriate adhesive that is compatible with the pipes 40 and the butterfly valve 10. The butterfly valve 10 is positioned inside one of the two pipes 40 with the anti-rotation tab 30 in contact with the surface of the slot 51 and the stem 20 in contact with the surface of the opening 52. The other pipe 40 is brought into contact with the first pipe 40, so that the planar surfaces 41 mate and the surfaces of the slot 51 and the opening 52 are also in contact with the anti-rotation rotation tab 30 and stem, respectively, of the butterfly valve 10. The valve stem 20 extends outside the two pipes so joined to form the valved conduit for operation of the butterfly valve 36 through the handle 38. A valved conduit according to an embodiment of the invention is completed when the adhesive is cured.

In accordance with a further embodiment of the invention, the valved conduit preferably includes a cover member circumferentially surrounding the joint. The cover includes two semi-cylindrical cover members that, together, include an opening through which the valve stem 20 extends. The cover provides not only added strength to the joint but also a neater appearance to the joint that is more pleasing when the valved conduit is exposed to public view.

Figure 2:
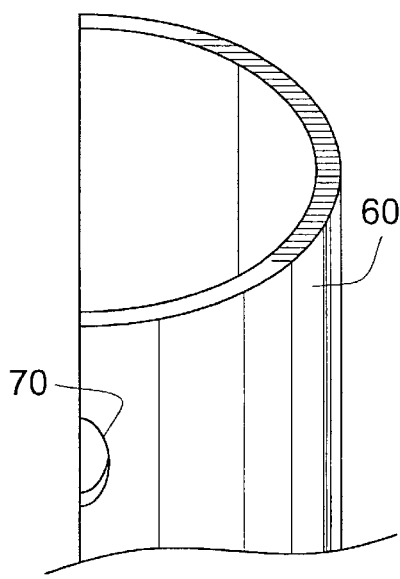
FIG. 2 is a perspective view of one of two cover members for covering a pipe joint according to an embodiment of the invention.
Figure 3A:
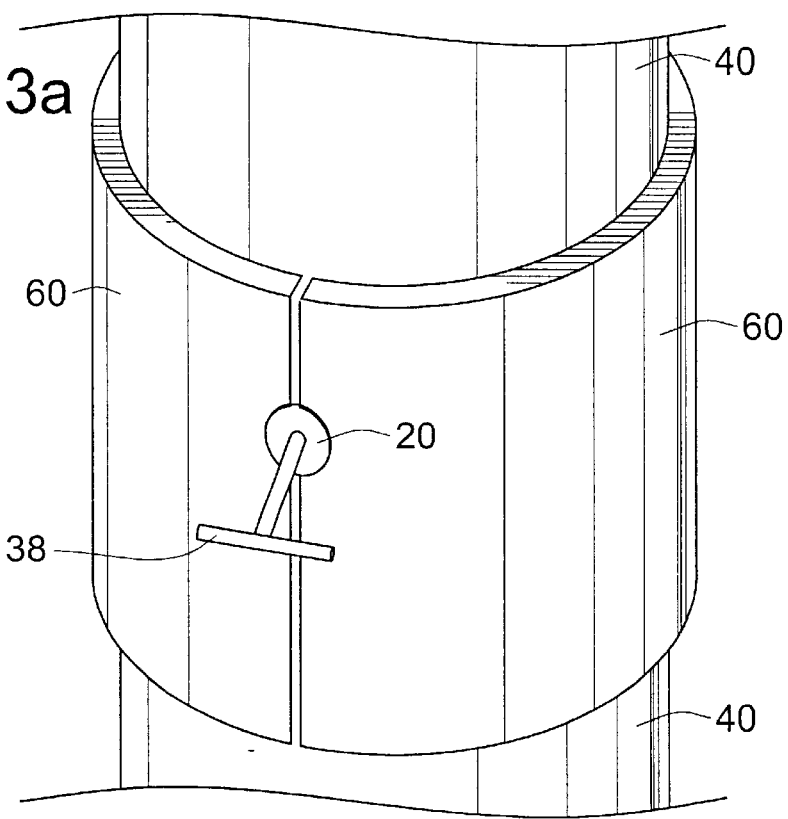
FIG. 3(a) is a perspective view of an assembled valved conduit according to an embodiment of the invention without cover members and FIG. 3(b) is a perspective view an assembled valved conduit according to the invention with two cover members in place.
Figure 3B:
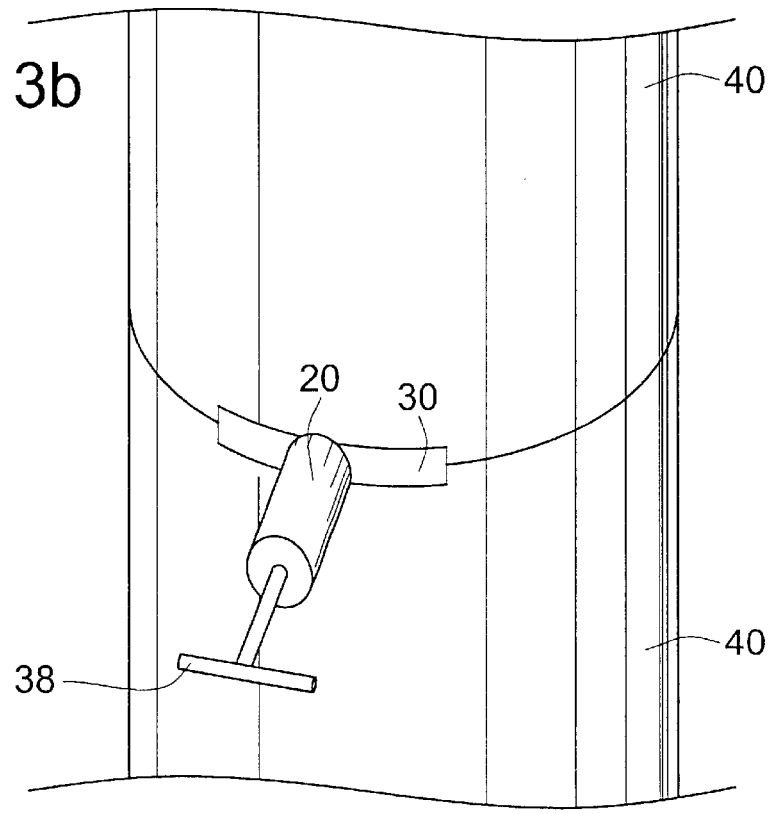

One cover member 60 is illustrated in FIG. 2. The cover member is shaped to cooperatively surround the pipes 40 that are joined at a joint. Two of the cover members 60 illustrated in FIG. 2 are applied to obscure and strengthen the joint. Those cover members include cut-outs 70, that, when two cover members are applied to a joint, provide an opening through which the valve stem 20 extends. Two such members 60 are adhesively bonded to the two pipes 40 as shown in the perspective view of FIG. 3(b). Generally, the cover members 60 are made of the same material as the pipes 40 but have an inside diameter equal to the outside diameter of the pipes 40. FIG. 3(a) is a perspective view of an assembled valved conduit according to the invention but without the cover members 60 that are shown in place in FIG. 3(b). It is convenient in manufacturing the valved conduit to use the same adhesive to join the cover members to the pipes 40 that is employed in bonding the pipes 40 together.

Although the invention has been described with respect to certain embodiments, various additions and modifications within the spirit of the invention will occur to those of skill in the art from the foregoing description. All such changes, that do not depart from the scope of the invention, are encompassed by the following claims.

I claim:

1. A valved conduit comprising:
   two substantially flangeless pipes adhesively bonded end-to-end at respective end walls of the two pipes at a joint including an opening and a slot; and
   a butterfly valve including a protruding stem and a protruding anti-rotation tab, the butterfly valve being disposed inside the two pipes at the joint with the stem and the anti-rotation tab being engaged by end walls of the two pipes at the joint, the stem and anti-rotation tab being in contact with the opening and the slot, respectively the stem extending through the opening and beyond the pipes.

2. The valved conduit of claim 1 comprising a cover circumferentially surrounding the joint and including an opening through which the stem extends.

3. The valved conduit of claim 2 wherein the cover comprises two semi-cylindrical cover members bonded to the two pipes at and extending beyond the joint.

4. The valved conduit of claim 1 wherein the butterfly valve has a housing with an outside diameter smaller than an inside diameter of the pipes.

5. The valved conduit of claim 1 wherein the two pipes are fiberglass.

6. The valved conduit of claim 5 comprising a cover circumferentially surrounding the joint and including an opening through which the stem extends.

7. The valved conduit of claim 6 wherein the cover is fiberglass.

8. A method of making a valved conduit comprising:
   shaping end walls of two substantially flangeless pipes to form substantially planar end wall surfaces, each end wall also including surfaces defining an opening for receiving a valve stem and a slot for receiving a valve anti-rotation tab;
   applying an adhesive to the end wall surfaces;
   positioning a butterfly valve including a stem and an anti-rotation tab within the two pipes with the stem and the anti-rotation tab between the end walls of the two pipes and the stem and the anti-rotation tab in contact with the opening and the slot, respectively, the stem extending through the opening beyond the pipes; and
   bringing the substantially planar end wall surfaces into contact and adhesively bonding the substantially planar end wall surfaces of the two pipes together at a joint.

9. The method of claim 8 including applying the adhesive to the end wall surfaces defining the opening and the slot and bonding those end wall surfaces to the valve stem and the anti-rotation tab.

10. The method of claim 8 further comprising adhering two semi-cylindrical cover members to the two pipes, surrounding the joint to form a circumferential cover, the circumferential cover including an opening through which the valve stem extends.

11. The method of claim 8 wherein the butterfly valve has a housing with an outside diameter smaller than an inside diameter of the pipes.

12. The method of claim 8 wherein the two pipes are fiberglass.

13. The method of claim 12 further comprising adhering two semi-cylindrical cover members to the two pipes, surrounding the joint to form a circumferential cover, the circumferential cover including an opening through which the valve stem extends.

14. The method of claim 13 wherein the cover members are fiberglass.

* * * * *